United States Patent Office 3,443,441
Patented May 13, 1969

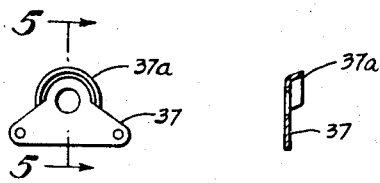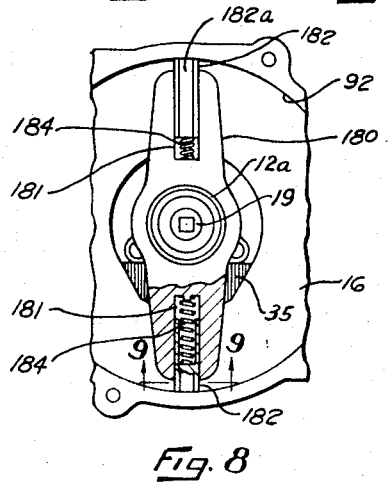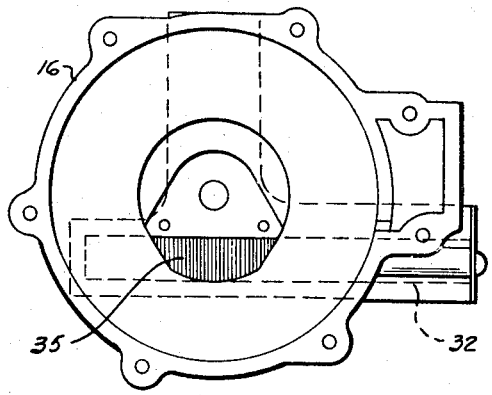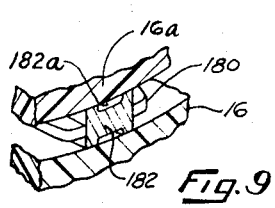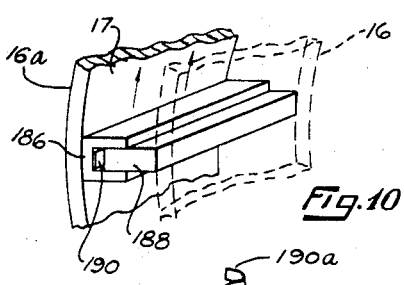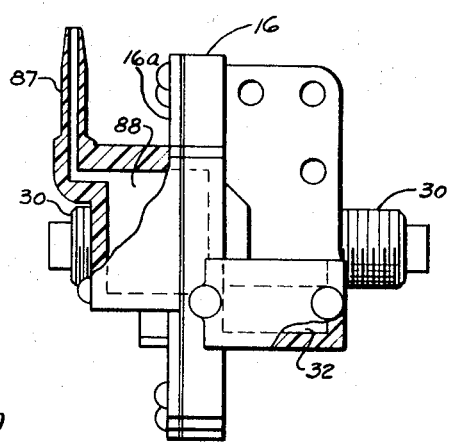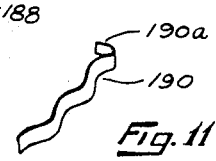

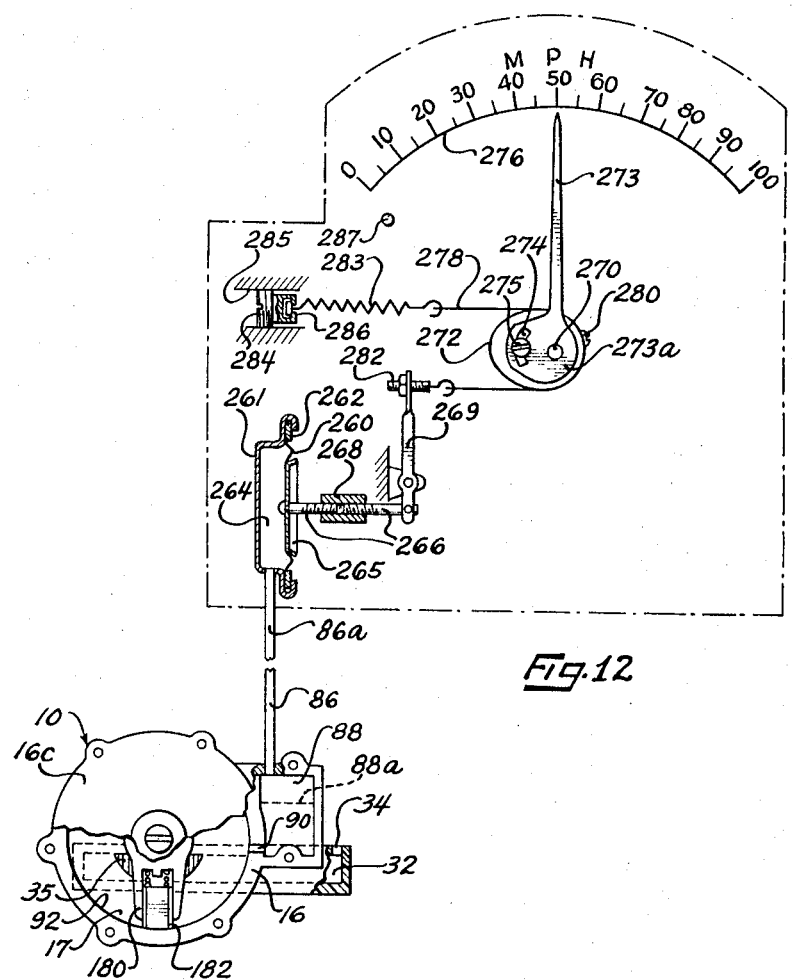

3,443,441
PRESSURE GENERATOR DEVICE
Robert H. Thorner, 8750–F. W. Chicago Blvd.,
Detroit, Mich. 48204
Application Apr. 8, 1963, Ser. No. 271,296, now Patent
No. 3,295,376, dated Jan. 3, 1967, which is a continuation-in-part of application Ser. No. 683,318, Sept. 11,
1957. Divided and this application Feb. 10, 1966, Ser.
No. 526,582
Int. Cl. G01p 3/26
U.S. Cl. 73—502                      24 Claims

ABSTRACT OF THE DISCLOSURE

The invention disclosed herein comprises a pressure generator including rotary means to produce an air pressure varying as a function of the rotary speed thereof. One form of pressure generator includes centrifugal-liquid pumping means having means to convert the liquid pressure produced thereby to air pressure which is hydraulically sealed and trapped and may be transmitted to any remote point to operate a sa speed governor or speed-indicator, for example. Air venting means are provided (without using valves) to enable the trapped air to vent to the atmosphere when the device is at rest, such a seach time the rotary device is stopped; in this manner, the trapped air is independent of ambient air pressure and temperature variations.

---

The present application is a divison of Ser. No. 271,-296, filed Apr. 8, 1963, now Patent No. 3,295,376 which is a continuation-in-part of my application Ser. No. 683,318 filed Sept. 11, 1957, now Patent No. 3,084,758.

The present invention relates to a rotating liquid device for generating pressure of a gas, such as air, that varies as a function of the rotary speed of the device, for use primarily (but not necessarily) in a speed indicating instrument, or for any other application requiring a pressure varying consistently as a function of speed.

Present speed indicating instruments such as tachometers and speedometers frequently require a driving means installed remotely from the indicating portion of the instrument. In automotive applications, for example, the rotary drive is installed at the transmission and is connected by a flexible shaft to the speedometer at the instrument panel of the vehicle. The flexible shafts are frequently troublesome, and are subject to binding or even breakage if the bends or loads imposed thereon are excessive. Also the present "drag cup" speedometers tend to flutter with some inaccuracy, which is amplified by torsional distortion or bending of the speedometer shaft, which becomes more pronounced as the shaft length is greater. In addition to all the foregoing the instruments used for present speedometers tend to be complex requiring a cost higher than desired.

A primary object of the present invention is to provide novel rotary driven pressure generating means having a self-contained body of liquid for producing a liquid pressure varying with the rotary speed of the driving means, and which generator means includes novel means to convert the liquid pressure developed by the generator means to trapped air pressure for facilitating remote installation of any device or mechanism subjected to the converted air pressure to be operated thereby.

A particular object of the present invention is to provide, in rotary-driven pressure generating means having self-contained liquid to produce pressure as recited in the foregoing paragraph, novel means to vent the trapped air to the atmosphere each time the generator comes to rest, whereby the pressure developed by the pressure generator is independent of changes in altitude, temperature, or other variable factors.

A further object of the present invention is to provide, in a pressure generator having self-contained liquid to produce pressure as recited in the foregoing paragraphs, novel means to prevent leakage of the fluid without the use of shaft seals such as would add to the torsional resistance of the unit, whereby the generator may be driven by flexible shafts, such as used in automotive speedometer and tachometer drives for example.

Another object of the present invention is to provide a speed indicating instrument, such as an automotive speedometer in which the usual flexible shaft may be eliminated and which is simple in construction with improved accuracy and reliability, and which enables easy remote installation.

Other objects and advantages of the invention will become apparent from the following description, and from the accompanying drawings, in which:

FIG. 4 is an elevational view of one of a pair of baffles provided to prevent leakage of liquid from the pressure generator of FIGS. 2 and 3;

FIG. 5 is a sectional view of the baffle taken on line 5—5 of FIG. 4;

FIG. 6 is an elevational view of the main housing of the pressure generator of FIGS. 2 and 3 with the rotor and vane removed;

FIG. 7 is a side elevational view of the pressure generator of FIGS. 2 and 3 with parts broken away to show the construction of the chamber for transmitting generated pressure;

FIG. 8 is a fragmentary elevation, with parts broken away of the generator, showing modified rotor and vane construction;

FIG. 9 is a section on line 9—9 of FIG. 8, with the parts shown in perspective to delineate the cross-sectional form of the vane;

FIG. 10 is a perspective view showing a modified form of the vane;

FIG. 11 is a perspective view of a backing spring used in conjunction with the vane of FIG. 10;

FIG. 12 is a diagrammatic view showing the pressure generator of the present invention arranged as a part of another or modified speedometer mechanism;

Figure 1:
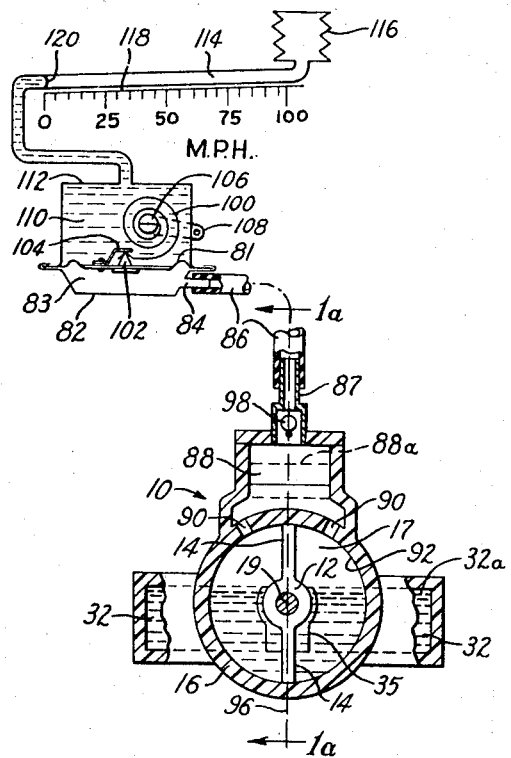
FIG. 1 is a central vertical sectional view of the pressure generator of the present invention taken along the line 1—1 in FIG. 1a and illustrated as part of a novel speedometer.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not for limitation.

In the primary inventive concept of the present invention, a novel fluid pressure generator is provided comprising in the forms shown, a small centrifugal-liquid unit preferably only partially filled with liquid such as oil, and having rotary vane means driven, for example, by the transmission or engine of an automotive vehicle to produce a fluid pressure varying as a function of the rotary speed of a driving element therein. In such construction a pressure-converter or transmitter preferably is provided to convert the liquid pressure to gas or air pressure which can be transmitted remotely any desired distance from the generator by suitable tubing or hose without the problem of filling with liquid the entire tube and the chamber of the pressure-sensitive member of the device controlled thereby, to operate any desired pressure-sensitive device or means in response to changes in speed. In several forms of the present invention the pressure sensitive means comprises a calibrated speed-indicator including a visual dial, whereby the entire mechanism comprises a speed-indicating instrument such as a speedometer or tachometer. In furtherance of the inventive concept, a liquid reservoir is provided in which the rest-level or liquid is below the outlet port (or ports) from the rotary vane means, and a pressure transmitter or converter chamber is provided to be located substantially above the port (or ports) but in communication therewith. In such desirable construction, the liquid traps air in the transmitter chamber, and the liquid rises therein as the device operated thereby is actuated.

A very important part of the inventive concept is that such novel construction enables all liquid to drain from the pressure transmitter chamber when the rotary generator is at rest, whereby the chamber vents air through the port to the atmosphere (to air above reservoir liquid) to equalize all pressures therein, so that the pressure of the air which is trapped only during operation varies consistently as a function of rotary speed irrespective of variations in ambient temperature, altitude, or other variable factors. In a preferred form, according to the inventive concept when used on moving vehicles, it is preferred to eliminate all centrifugal and acceleration effects by dividing the reservoir chamber into two portions, one on each side of a main housing and symmetrical with respect to the vertical centerline through the rotor and intersecting the rotary axis thereof; and further to provide that the center of mass of liquid in the pressure transmitter chamber resides on said vertical centerline through the rotor. It is part of the inventive concept to provide in combination with the foregoing pressure transmitter means, several forms of novel speedometer and tachometer mechanisms to facilitate said remote operation thereof without the usual flexible shaft in a manner hereinafter described.

Referring now to FIGS. 1–11 and particularly to FIGS. 1 and 1a, a pressure generator unit is illustrated as generally indicated by the numeral 10 in operative relation to a pressure sensitive device, such as a speedometer or tachometer, to be discussed in more detail hereinafter.

Figure 1A:
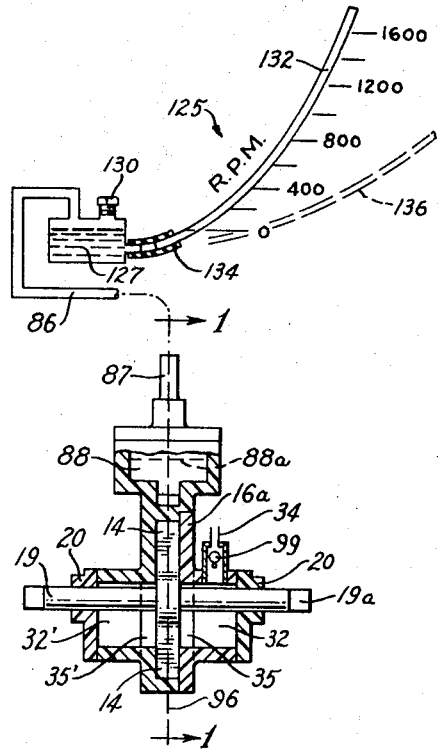
FIG. 1a is a central vertical sectional view of the pressure generator taken along the line 1a—1a of FIG. 1 and illustrated as a part of another form of speed indicator which is particularly suitable as a tachometer.
Figure 2:
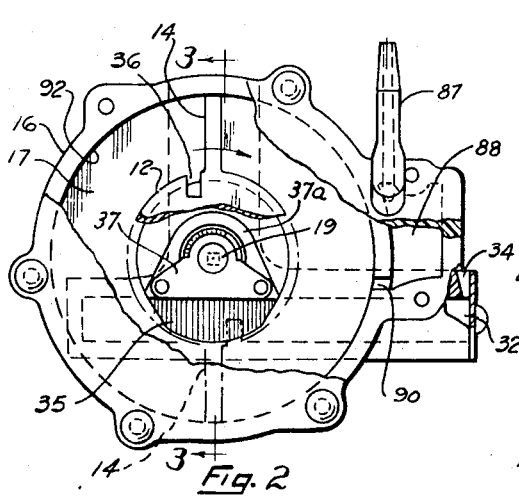
FIG. 2 is a fragmentary assembly view of another form of the pressure generator of the present invention (originally disclosed in Ser. No. 683,318) with a portion of the casing and a portion of the rotor and vane element of the generator broken away.
Figure 3:
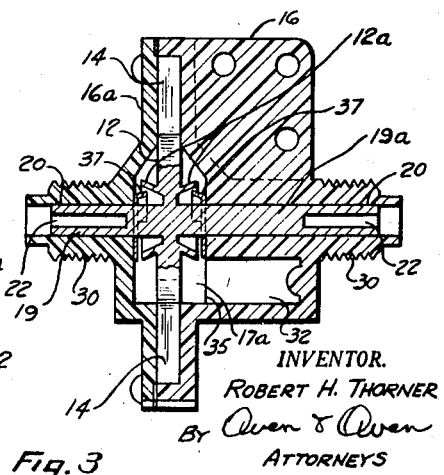
FIG. 3 is a central vertical sectional view of the pressure generator of FIG. 2 taken on line 3—3 of FIG. 2.

FIGS. 2 to 11 are views of typical constructions of the pressure generator unit originally disclosed in Ser. No. 683,318 and are similar to the form of generator shown in FIG. 1, except for minor modifications as will be discussed. Referring to the pressure generator units of FIGS. 1–11, which illustrates the application as a speedometer or tachometer, a rotor 12 carrying vanes 14 rotates in a housing, the facing halves of which are designated 16, and 16a in FIGS. 1a and 3. The rotor and housing together form a pressure chamber 17. The rotor is driven by a shaft 19, which may be an integral part of the rotor and is journalled in housing extensions 20 as shown best in FIGS. 1a and 3. The shaft may be adapted to be driven at 19a by any suitable means, but in FIGS. 2, 3 and 7 is illustrated as adapted to be connected directly to any suitable drive, such as to an output shaft of an automotive vehicle transmission, whereby the tang of the shaft is directly driven by the transmission (not shown) and is of square section for insertion in a square hole 22 in the end of the shaft for establishing a driving connection.

In the forms shown in FIGS. 2, 3 and 7, the housing 16, 16a includes threaded extensions 30 on either end thereof to receive retaining couplings (not shown) preferably conforming to SAE standards, whereby a single design of pressure generator will fit all automotive vehicles, for example. While the pressure generator shown in FIGS. 2–11 is illustrated with standard SAE couplings, any other positive mechanical drive may be employed.

The housing 16 includes a reservoir 32 filled with any suitable liquid such as hydraulic brake fluid, silicone oil, ethylene glycol, etc., to a predetermined maximum level 32a as determined by a filter and vent opening 34. The liquid is fed by gravity to an inlet aperture or port 35 in the housing to fill the pressure chamber 17 at the same reservoir level when the device is at rest. In actual operation as shown by the shade portion in FIGS. 2, 6 and 8 the port 35 comprises merely an opening or aperture in the housing wall between chambers 17a (FIG. 3) and reservoir chamber 32. The liquid fills the pressure chamber 17 when the liquid is moved in a circular path by the vanes and is urged outwardly against the cylindrical wall 92 of the chamber 17 by centrifugal force to produce a liquid pressure at the wall varying substantially as a function of the square of the rotary speed of the rotor.

The shafts 19 and 19a may be sealed from leakage by any suitable means such as synthetic rubber or leather lip seals (not shown). However when the generator is driven by a thin or light shaft, it is frequently desirable to have the torsional resistance of the vane, rotor and shaft assembly as low as possible to prevent torsional whip of the shaft with possible fracture thereof. Although seals may be obtained with low torsional resistance, they eventually may leak whereby the device would become inoperative. In order to prevent leakage past the shaft whenever negligible torsional resistance is desired, the pressure generator unit disclosed herein may be adapted to use a novel arrangement of baffles. Referring to FIGS. 2, 3, 4 and 5, two baffles 37 having semi-circular projecting portions 37a are secured by suitable means, as by the drive screws shown in FIG. 2, to the inner walls of the pressure generator. The rotor 12, which is illustrated as being formed of molded plastic, includes in the molding (although it could be separate) two cup-shaped portions 12a which are arranged to cover the baffle projections 37a.

With the foregoing construction, the liquid is thrown outwardly by the vanes 14 when rotating so there is no tendency for leakage through the shaft opening at this time. Also, it can be seen that when the generator is inactive the liquid level in the reservoir 32 is below the shaft clearances and also below the cup-portions 12a so no leakage would occur when the generator is at rest. When the unit is started, any splashing of liquid (which would be negligible because of the thickness of the oil used) is blocked by the cup-portions. Then after the unit is operating with the pressure chamber 17 filled with liquid and the unit is then stopped, the liquid tends to flow around the chamber 17 to the bottom thereof and back to the reservoir 32 through the slots 36 (enough being provided for that purpose) and through the opening 35. Any oil or other liquid that leaks past the clearances of the rotor flows in one path down the side walls because of surface tension of the liquid where it meets the baffle projection 37a which directs the liquid around the shaft to the bottom of the generator without leakage. Another path of liquid, immediately after the generator is stopped, is along both sides of the rotor as viewed in FIG. 3; but surface tension will cause the liquid to "hug" the surface of the rotor until it reaches the cup-portions 12a which direct the liquid around the shaft to the bottom of the generator without leakage.

Sealed conduit means are provided to convert and transmit the liquid pressure developed by the pressure generator to equivalent air pressure for actuating the sensing member of the controlled or indicating mechanism. In FIG. 1, the controlled mechanism includes a speed indicating means which will be discussed hereinafter. For the present it suffices to explain only that the pressure responsive or pressure sensitive means (sensing member) in the form of the invention shown in FIG. 1 includes a diaphragm 81 sealed by a cover 82 which forms a chamber 83 and carries a nipple 84 for a rubber hose 86 (FIG. 1) to be connected to a similar hose nipple 87 in the pressure generator (see FIGS. 1, 2 and 7). If a sealed metal tube is used for the connection of the two units in place of a rubber hose, then the hose nipple may be replaced by any suitable metal connecting fittings.

The coaction of the pressure generator unit and the pressure sensitive member may now be described. The pressure in chamber 83 is produced by the pressure generator which is sealably connected to chamber 83 by means of the conduit 86 and a pressure transmitted or converter 88 in the pressure generator, as shown in FIGS. 1, 2 and 7. Referring to these figures, and particularly to FIG. 1, the pressure converter 88, in the forms shown, comprises a well or vessel of substantially enlarged cross-sectional area in relation to the cross-sectional area of the tube or conduit 86. The vessel or well 88 is connected to the cylindrical pressure chamber 17 through an aperture such as a port or passage or conduit 90, which in FIGS. 1 and 2 merely comprises a slot or hole in the housing at the cylindrical wall 92 as shown. The passage 90 is preferably located at least slightly above the highest possible level of the liquid in the reservoir 32, as shown in all forms, for reasons to be discussed.

When the pressure generator is at rest, the liquid level in the pressure chamber 17 is the same as in the reservoir chamber 32 whereby the lower segment of the pressure chamber is filled with liquid (as it seeks its level). In the form shown in FIGS. 2, 3 and 7 the liquid level in this lower segment is desirably below the lowest part or opening for the shaft at 19a so the liquid cannot leak out at this condition of rest as discussed previously. Also, the level in the pressure chamber at rest in FIGS. 1, 2 and 3, as previously mentioned, is arranged to be below the port or passage 90 to expose to the atmospheric pressure (then in chamber 17) the normally sealed space formed by the pressure converter 88, the chamber 83 and the connecting tbe 86. This normally-sealed space is vented (only when the generator is at rest) to the atmospheric pressure above the liquid level 32a in reservoir 32 and through the vent 34, as shown in FIGS. 1, 1a and 2.

When the shaft 19 is rotated, the vanes 14 revolve in the housing 16 and move the liquid from the lower segment in a circular path in the chamber 17 whereby centrifugal force of the liquid produces a pressure against the cylindrical wall 92, which pressure varies substantially as the square of the rotary speed. As the liquid is thus moved away from the lower segment of chamber 17, more liquid from the reservoir flows into chamber 17 through the opening 35 from the reservoir. In this manner, very soon after the generator is started, the chamber 17 is substantially filled with an annulus of liquid so that the maximum possible pressure (at each speed) is produced on the wall 92. As the liquid is caused to circulate in chamber 17, it tends to flow through the port or conduit 90 into the pressure converter chamber 88. But as soon as the passage 90 is filled with liquid, air is trapped in the space formed by the chambers 88, 83, and the connecting conduit 86. The liquid pressure in conduit 90 is transmitted to the trapped air (regardless of the length of the tube 86) whereby the air pressure in chamber 83 acting on the diaphragm 81 is always the same as the liquid pressure adjacent the trapped air. This action produces an air pressure acting on the diaphragm 81 which varies smoothly and consistently as a function of the speed of rotation of the rotor 12.

The form of pressure generator illustrated in FIGS. 1 and 1a is an improvement over the form shown in FIGS. 2, 3 and 7 (originally disclosed in Ser. No. 683,318). In form shown in FIGS. 2 and 3 when used on an automotive vehicle, a small error is caused by the acceleration and centrifugal forces acting on the liquid in reservoir chamber 32 and transmitter chamber 88. This small error is brought about because chambers 32 and 88 are not centrally located with respect to the central vertical axis 96 of the rotor 12. This small deviation would not be present when the device is stationary, as when used in speed indicators or governors for stationary engines, for example. While this small error is not critical when the generator is used in automotive governors, it is better if the error is eliminated entirely. However, for a calibrated speed-indicating instrument, it is desirable to eliminate such errors.

In the improved form of pressure generator illustrated in FIGS. 1 and 1a, a second reservoir chamber 32' is provided opposite from and identical to chamber 32 such that the two reservoir chambers are completely symmetric with respect to the vertical axis. Hence any acceleration, inertia or centrifugal forces acting on the liquid therein do not affect the output air pressure since the effects of the pressure changes in each chamber neutralize each other. Also, in FIGS. 1 and 1a, the pressure transmitter chamber is mounted directly above the rotor 12 such that the center of mass of liquid in chamber 88 lies on the vertical axis 96; in such construction, any centrifugal or acceleration forces acting on the liquid in chamber 88 would not affect the air pressures transmitted to chamber 83. Hence in this preferred form, the center of mass of the liquid in the reservoir chamber and in pressure transmitter chamber resides on the central vertical axis 96 through the rotor 12.

Another improvement in the form shown in FIGS. 1 and 1a, is that the ports 90 and reservoir-level 32a are arranged to enable the diameter of the rotor 12 to be substantially reduced. The level 32a is high enough to provide sufficient liquid to fill the volume ahead of each vane along its entire length as it passes the ports 90. Since this length is substantially increased, the output pressure is increased for a given size of pressure generator. The shape of the aperture 35 in FIG. 1 is disposed to maximize this desirable result, by enabling the longest possible "column" of liquid as it passes the ports 90. This aperture extends to the bottom of reservoir 32, 32' and narrows as it approaches ports 90 while enabling air to vent above level 32a. The bottom of reservoir 32 could be lowered if desired, and the aperture 35 may be lowered correspondingly. Still another improvement is to provide check valves, such as ball valves 98 and 99, in the transmitter chamber 88 and reservoir chamber 32, resepectively; the balls are retained by suitable pins or the like to be open, as shown, as long as only air passes by the balls. However, if the pressure generator is inverted, as in shipment, the balls close to retain all the oil in the unit without leakage.

Before describing the overall operation of the pressure generator, it will be helpful first to explain the additional mechanism shown in FIGS. 1 and 1a which, when combined with the pressure generator, comprises several forms of speed indicating instruments. Referring first to FIG. 1, the force produced by diaphragm 81 due to the air pressure in chamber 83 is opposed by a spiral "clock" spring 100 or other equivalent biasing means. One end of spring 100 includes an inverted V-bend to act as a knife-edge on a cone or knife member 102. The V-bend is retained with minimum clearance by a retainer strip 104 suitably secured to diaphragm 81. The other end of spring 100 is secured to and supported by a rotatable shaft 106 disposed for rotary adjustment by an arm 108 for purposes to be described. The diaphragm 81 encloses and seals a chamber 110 formed by a housing 112 and filled with a colored liquid, such as used for anti-freeze or hydraulic brakes. A flexible transparent tube 114 having a small bore made into any desirable shape receives liquid from the housing. A substantially rateless bellows 116, which might be made of thin synthetic rubber, may be connected to the end of tube 114 to enclose the air therein, but is not essential. A speed-indicating scale 118 is mounted adjacent tube 114 and calibrated in units of speed, which is miles per hour in the example shown.

For automotive vehicles, the diaphragm 81 and chamber 112 is preferably mounted vertically to be independent of centrifugal and acceleration effects. The zero position is set by moving arm 108 downwardly, as viewed in FIG. 1, to pre-load spring 100 upwardly for balancing the slight head of liquid in chamber 110 until the meniscus 120 is set at zero. When the speed increases, diaphragm 81 is moved upwardly biased by spring 100 to cause liquid to travel into tube 114 by an amount varying as a function of speed. Bellows 116 is disposed to expand or contract to accommodate the travel of liquid through tube 114. However, I have found that by using a small tube, such as ⅛ diameter or less, the device operates satisfactorily without the bellows. By reducing the number of coils on spring 100, its rate can be made variable to provide a substantially uniform calibration.

FIG. 1a shows the pressure generator combined with a particular type of manometer to provide a tachometer which would be extremely accurate, sensitive and consistent. The manometer 125 is generally U-shaped in which one leg or segment of the U comprises a well chamber 127; the manometer also includes a sealable filler plug 130, and a small-bore transparent tube 132 connected to the well chamber 127 by a separate connector, such as a short piece of synthetic rubber tubing 134. In the form of the invention shown in FIG. 1a, the manometer liquid comprises the means responsive to the trapped air pressure from the pressure generator in addition to comprising the visual indicating means; hence in referring to FIG. 1a, the term "pressure responsive means" is intended to include tube 132 and the liquid 127 which is caused to travel therein a distance varying as a function of the pressure in chamber 88. The tube 132, which comprises the second leg or segment of the U, is shown in FIG. 1a as bent somewhat semiparabolic in shape to provide a uniform scale of r.p.m. as illustrated, since the outlet pressure from the generator varies substantially as the square of the speed. If water is used in the manometer the scale could be 24 to 36 inches long for example which would enable the provision of small divisions of speed increments. Since no friction is produced in any portion of the speed-responsive means in the generator or manometer the combined instrument is completely consistent compared to mechanical tachometers having limited lengths of scale. Other scales may be provided for lower speed ranges. For example, a range of 0–800 r.p.m. may be provided by removing tube 132 and its scale and providing another tube and scale 136, shown in dotted lines, which would be connected to the well 127 by tube connector 134. If desired several speed ranges may be provided by including a system of valves (not shown) instead of the tube connector 134. A flexible shaft extension may be provided (as for threads 30 and shaft square 22 in FIG. 3); the other end thereof would operate a speed take-off tool as now done with all direct reading tachometers or counters for use with a stop watch. The free end of the flexible shaft might include a handle to hold the take-off tool against a rotating shaft to measure speed.

If desired, the tube 132 can be straight and vertical. If the tube is about 24–36 inches long for the entire speed range, for example, the non-linearity of the scale is not important.

The extreme accuracy possible with the combination shown in FIG. 1a is dependent on the use of a small bore for the tube 132 for reasons now to be discussed.

Having described the constructional and operative relationship of the speed-indicating instruments of FIGS. 1 and 1a, the final operation and utility of the pressure generator briefly discussed above, can now be understood. The movements of the diaphragm and liquid, as explained above, are effected by the variation in pressure in the generator chamber 17 produced by the centrifugal force of the circulating liquid therein; hence the liquid pressure in chamber 17 which varies as a function of speed is transmitted as an equivalent air pressure to the diaphragm in chamber 83 through the passage 86 and chamber or well 88. This pressure in chamber 83 is balanced by the force of spring 100, as explained. As the pressure in chamber 83 changes, the diaphragm and liquid move to another position until balanced by the new force of spring 100.

In order to produce the movements of the diaphragm 81 as above described, liquid must be displaced from the pressure generator to accommodate movements of the diaphragm 81 upwardly, as viewed in FIG. 1, and liquid must return to the generator when the diaphragm 81 is moved downwardly by the biasing spring force as the pressure in chamber 83 reduces. However, with air trapped in the tube 86 between the generator and the sensing diaphragm, the liquid rises in chamber 88. With this arrangement, the net pressure received by the sensing diaphragm is diminished by the variable "head" of liquid in chamber 88 so that the diaphragm 81 actually receives pressure minus this "head." In order to minimize this effect, the novel well or pressure-converter 88 is provided for the concept of converting liquid pressure to air pressure. In this construction, the well 88 is of sufficiently large diameter that the liquid will rise only about ½ inch or less, for example, accompanying the displacement of the diaphragm 81, whereby the pressure transmitted to the diaphragm is diminished only slightly as a result of the liquid "head" accompanying diaphragm movement. Also, with the well-type pressure converter in which the pressure is transmitted from the well to the sensing diaphragm through the medium of air, the concept permits installation of the pressure-sensitive device either above or below the generator unit 26 and at any remote distance therefrom without any change in the calibration.

In the preferred arrangement as explained previously, the passage or ports 90 are located above the highest level in the reservoir chamber 32. Then, whenever the vehicle stops, all the liquid flows out of the pressure converter chamber 88 and passages 90 into the bottom of the pressure chamber 17 to seek the same level as in the reservoir; then the entire space of the chambers 83, 88 and conduit 86 is exposed to the existing atmosphere through the air space above the liquid level in the reservoir via opening or port 35 and the filler opening 34 as well as through the slight air space around the shaft 19, 19a. Thus, with this arrangement, the pressure of the air in chambers 83, 88, and conduit 86 is equalized to the atmosphere regardless of altitude or temperature effects every time the device stops even for a short time. If the generator is operated in an automotive vehicle, then the fresh or equalized "charge" or air for chambers 83, 88 and conduit 86 occurs each time the vehicle is stopped, as at stop lights.

When the generator vanes are revolved, the liquid in chamber 17 is moved in a circular path as explained. The centrifugal force thus produced causes liquid to try to flow through the port or passage 90, but as soon as this port is covered by the liquid, the new charge of pressure-equalized air is trapped between the liquid and the sensing diaphragm 81; then the liquid only flows into the pressure converter well 88 to displace the diaphragm 81, as explained, whereby the liquid level might rise to the dotted line 88a in FIG. 1.

It can now be understood why the tubes 114 and 132 should be as small as possible. The displacement of the pressure liquid in chamber 88 will be less if the travel-volume in tubes 114 and 132 is minimized, thereby facilitating a smaller pressure generator and/or a smaller "head" in chamber 88. Any transparent tubing having a bore diameter of about ⅛ inch or less and made of suitable material may be used.

FIG. 8 illustrates a modified form of rotor and vane assembly which may be used in the pressure generator tending to eliminate end clearances of the vanes particularly in production units. The rotor 180 is not as close fitting as in the form of FIGS. 2 and 3, but comprises a thin revolving plate as shown in FIG. 8 and the sectional perspective view in FIG. 9. The plate has a pair of diametrically opposite slots 181 adapted to receive rectangular vanes 182 which are slidable outwardly in the slots under the influence of centrifugal force and also by springs 184 if desired. The vanes are made wide enough to be self-guiding and hence can be "pushed" around the generator housing by the rotor in sliding movements between the walls of housings 16 and 16a as shown in FIG. 9. The liquid is urged outwardly by centrifugal force to form a torus-shaped chamber as though it were a sealed or formed chamber as in FIGS. 2 and 3. The vanes may have slight undercuts 182a on their sliding faces in order to reduce the surface tension in their sliding travel around the walls of the generator. If the vanes are made heavy enough, the centrifugal force thereon may be sufficient to urge them against the outer wall 92 and the springs 184 may be omitted.

In any of the forms of pressure generator illustrated herein, more vanes may be employed such as three or four, etc. Additional equally-spaced vanes tend to reduce slippage of liquid past the vanes up to a certain point.

In order to eliminate the production variations of side clearance of the vanes, the form of vane shown in FIG. 10 which is a modification of the form shown in FIGS. 8 and 9, may be employed. In this form of vane, which slides outwardly in the slots 181 of the rotor 180 (not shown in FIG. 10), the vanes comprise a channel 186 adapted to receive and guide a slat 188. The channel and slat are urged apart against the walls of the housings 16a and 16, respectively, by spring means such as by a light wave spring 190 shown in detail in FIG. 11. The wave spring has an inturned end 190a to prevent the spring from scraping the outer wall 92. If the vane parts are heavy enough, the spring 184 can be deleted as shown in FIG. 10.

If it is desired to reduce the size of the pressure generator, mercury may be used as the liquid therein. Since mercury is about fourteen times as heavy as oil it would produce correspondingly higher pressures in the generator unit. Mercury has a very low viscosity so it would be very fast-acting or sensitive in governor operation.

FIG. 12 illustrates another form of the invention adapted as a speed-indicating instrument, and specifically as a speedometer for automotive vehicles. The novel pressure generator unit of the present invention may be used in combination with a particular type of pressure responsive device including a pointer and dial calibrated in miles per hour to comprise a speedometer which lends itself to low cost manufacture because of its inherent simplicity. In addition, a speedometer utilizing this principle eliminates the need for a flexible shaft with its inherent problems of bending and noise that lead to breakage.

In order to accomplish the foregoing desirable result, several problems must be overcome in adapting the pressure generator of the governor as a speedometer. One problem relates to the requirement in all speedometers for automotive vehicles that an odometer must be provided to indicate the total miles traveled. Since the pressure generator adapted as a speedometer can eliminate the speedometer flexible shaft, means other than a counting mechanism driven by the flexible shaft must be provided. Another problem is that the pressure produced by the generator varies substantially as the square of the speed, but the unit desirably should have uniform calibration in miles per hour on the face of the speedometer.

Referring to FIG. 12, the pressure generator unit is illustrated substantially as shown in FIG. 8. The elements common with the forms shown in FIGS. 2, 3, 7 and 8 are indicated by the same numerals. The manner of producing an air pressure that varies with speed in the converter chamber 88 is the same as shown and described in relation to FIGS. 2, 3, 7 and 8, and needs no further discussion here.

The air pressure produced in chamber 88 is transmitted to a novel pressure responsive speed indicating unit as illustrated in FIG. 12. For operating the instrument, the air pressure from chamber 88 is transmitted through conduit 86 to a diaphragm 260 sealably clamped between a casing 261 and retainer ring 262 to form a pressure chamber 264. Any suitable rubber or metallic diaphragm (such as a metallic bellows) may be used as the pressure responsive member, but a molded synthetic rubber diaphragm is illustrated in which a metal disc 265 causes the diaphragm to flex at the convolution thereof. A shaft 266 is secured to the diaphragm by suitable means and comprises two segments as shown oppositely threaded for adjustment lengthwise by a turnbuckle 268. Suitable travel-amplifying means are provided such as a fulcrumed lever 269 connected to the shaft to multiply the travel thereof.

A rotatable pointer shaft 270 is journalled by any suitable means to carry a cam or guide member 272 which is secured to the shaft for rotary movements therewith. A pointer member 273 includes a mounting portion 273a disposed to fit over the end of the shaft 270 for rotary movements thereabout. The mounting portion includes an arcuate slot 274 through which a screw 275 projects into a threaded bore in the cam for securing the pointer thereto after adjustment of the angular relation of the cam and pointer has been made. Rotation of the cam and shaft causes the pointer to indicate miles per hour (or r.p.m. for tachometers) on a suitably calibrated scale 276.

The pointer 273 is rotated by a strap or leaf strip 278 (or wire) of very thin material, such as .0015 to .003" sheet stainless steel or beryllium copper for example, wrapped around the cam and secured at one point thereof as by a screw 280. The leaf strip is secured at one end to the lever 269 by any adjustable connecting means, such as by the threaded pin 282 retained by a nut thereon and connecting with the strip by a wire hook, or the like, as shown. The other end of the strip 278 is connected to an extension spring 283 hooked through a hole in the end of the strip. The other end of the spring is retained in an adjustable fixed position by an adjusting screw 284 threaded in a fixed bore 285 and including a suitable swivel 286 for retaining the spring end without twisting during adjustment of the screw 284.

The operation of the device as a speedometer (or tachometer) may now be described. Assuming, for example, that the pressure generator 10 is driven by the transmission of the vehicle at a speed proportional to the speed of the vehicle, the pressure produced in chamber 88 varies substantially as the square of vehicle speed. This speed sensing pressure is transmitted from chamber 88 through conduit 86 to act on the diaphragm 260. The speed-indicating unit, which is mounted conventionally in the instrument panel, includes all the mechanism within the dash lines of FIG. 12. The speedometer indicates miles per hour speed when the vehicle speed increases, for example, because the diaphragm 260 moves the lever 269 to pull the strip 278 in opposition to the spring 283 and revolve the cam and pointer clockwise to indicate a higher speed. The pointer stops moving when the new increased pressure in chamber 264 which corresponds to the new increased vehicle speed is balanced by the increased force of the spring 283. When the speed decreases, the speedometer operates in a reverse manner. The post 287 is a zero stop for the pointer, and the spring 283 is adjusted to provide a minute force at this zero condition.

The cam or guide member 273 serves to provide uniform graduations on the scale 276 in view of the nonlinear sensing pressure generated in chamber 88. The cam actually comprises two cam or guide surfaces and one or both may be used as required. The upper half of the cam contour, as viewed in FIG. 12, comprises one guide surface, and the lower half of the cam comprises the second guide surface. In FIG. 12, the pointer is illustrated in a vertical position at 50 m.p.h. at one half of its total travel. When the pointer and cam are revolved to the zero position, the effective lower radius of the strip acting on the shaft 270 is increased while the effective upper radius of the strip (and spring) acting on the shaft is decreased. At 100 m.p.h. when the pointer is at maximum travel, the radius for the lever action decreases, while the radius for the spring increases. Thus, for uniform or linear travel of the pointer, the lever 269 must apply a force that varies with travel at a rate greater than linear. Since the pressure in chamber 264, and hence the force to the lever, varies substantially as the square of the generator speed, the contour of one or both of the cam portions is cut as required to provide exactly uniform graduations on the scale 276. Thus, the cam serves as a variable lever having a working ratio that compensates for the non-linear pressure variation produced by the generator and provides uniform, or any other desired graduation of the scale.

For automotive applications the Society of Automotive Engineers (SAE) have standardized the permissible production error for speedometers. According to their limits, production speedometers may vary ±1 m.p.h. at 10 m.p.h.; +2 and −0 at 30 m.p.h.; +3 and −0 at 60 m.p.h.; +4 and −0 at 90 m.p.h.; and +5 and −0 at 120 m.p.h. In the speedometer of FIG. 12, production variations could occur in the spring 283, the cam and its angular relation to the pointer, in the position of the lever, and the effective area of the diaphragm. If all these variables are "stacked" in either direction, some of the production units might be outside the SAE limits. The various adjustments in the speedometer shown in FIG. 12 as decribed above have been provided to compensate for these production variations. The adjustment 284 sets the spring; the adjustment of the screw 275 and slot 274 sets the angular relationship of the pointer and cam; the adjustment of the pin 282 sets the position of the lever, and the adjustment of the turnbuckle 268 sets the position of the diaphragm with its slight area variation. Thus the purpose of the lever is to keep the travel of the diaphragm small (such as 1/16 to 1/8") and provide sufficient travel of the strip to facilitate operation of the cam. If desired, another adjustment may be provided if the strip includes a slot therein for the screw 280 so the position of the strip may be set.

If the speed indicating device as shown in FIG. 12 were calibrated as a tachometer to indicate engine r.p.m., for example, the pressure generator would be driven by the engine instead of the transmission. For this application an odometer is unnecessary, and the pressure generator could be used exactly as shown and described in relation to FIGS. 1, 2, 3, 7 and 8.

FIGS. 22, 23 and 24 of my said co-pending application, Ser. No. 683,318, illustrate a novel method for installing the speed governor thereof in automotive vehicles if the pressure generator unit is provided as a speedometer and is an inherent part of the vehicle; in this example only the servo-unit 11 (including servomotor 126) must be added to provide a governor. This desirable result may be realized, at least for road-speed-sensing governors, since all automotive vehicles are equipped with speedometers. Then with the speedometer of the present invention supplied as standard equipment on automobiles, a low cost speed governor may be obtained merely by providing the servo-unit, as disclosed in my said co-pending application. Referring to FIG. 22 of said co-pending application, the branch conduit 86b communicates with the sensing diaphragm 81 (FIG. 1) and to the pressure converter chamber 88 of the speedometer pressure-generator through conduit 86.

All farm tractors and diesel trucks use engine-driven tachometers in addition to governors as standard equipment. Hence, in these installations, a governor combined with a tachometer as disclosed in FIGS. 22–25 of my said application, Ser. No. 683,318 would require only the servo-unit 11 since the generator unit would perform a double function. However, with either road or engine speed drives, when the governor mechanism utilizes the speedometer (or tachometer) sensing pressure, the liquid reservoir 32 and pressure chamber 88 must be larger to handle the capacity of both diaphragms 81 in the governor, and 260 in the speedometer.

While the pressure generator has been illustrated herein primarily in combination to provide speed indicating instruments, the generator may be usefully employed to operate any device which must operate in response to changes in speed. Examples of such devices are shown in my said application, Ser. No. 683,318, in FIGS. 20, 20a, and 21, and need not be repeated here.

What I claim is:

1. In a fluid pressure-generator mechanism, the combination of, a centrifugal-liquid device having a closed circular pressure chamber and including rotary means for revolving a mass of liquid within said chamber to produce a liquid pressure as a result of the centrifugal force thereof that varies as a function of the speed of rotation of said rotary means, pressure transmitter means communicating with said chamber and including a trapped mass of air to convert said liquid pressure to air pressure also varying as a function of the speed of rotation of said rotary means during normal operation of said mechanism, aperture means between said pressure transmitter means and said chamber comprising the only path for liquid flow from said chamber, and means to vent said trapped air to the surrounding atmospheric pressure through said aperture means when said rotary means is at rest, said aperture means being constructed and arranged to be hydraulically sealed by said pressure-liquid during normal operation of said mechanism when said liquid passes through said aperture means from said rotary means to said pressure transmitter means to seal said chamber and preclude said air venting action.

2. The combination of means defined in claim 1, and said pressure transmitter means including an outlet for said air pressure, check valve means in said air pressure outlet to prevent liquid from flowing therethrough, reservoir means to supply liquid to said rotary means and having an air space above said liquid, and said air venting means including second check valve means to prevent said liquid from escaping through said venting means inadvertently.

3. In a fluid pressure-generator mechanism, the combination of, a centrifugal-liquid device including rotary means for revolving a mass of liquid to produce a liquid pressure as a result of the centrifugal force thereof that varies as a function of the speed of rotation of said rotary means, said rotary means including a chamber containing said revolving liquid for producing said centrifugal-liquid pressure therein, pressure transmitter means communicating with said rotary means chamber and including a trapped mass of air to convert said liquid pressure to air pressure also varying as a function of the speed of rotation of said rotary means, aperture means between said pressure transmitter means and said rotary means chamber on the pressure side thereof, said aperture means being hydraulically closed by said liquid when same covers said aperture means and flows therethrough from the outlet of said chamber into said pressure transmitter means for initiating and maintaining therein said entrapment of said air pressure produced by said rotary means, reservoir means mounted lower than both said pressure transmitter means and said aperture means to supply liquid to said rotary means, and vent means adjacent said reservoir means to vent said pressure transmitter means through said aperture means to the existing atmosphere adjacent said mechanism when said rotary means is at rest.

4. The combination of means defined in claim 3, and said pressure transmitter means including an outlet for said air pressure, check valve means in said air pressure outlet to prevent liquid from flowing therethrough, said reservoir means having an air space above said liquid, and said air venting means including second check valve means adjacent said space to prevent said liquid from escaping through said venting means inadvertently.

5. The combination of means defined in claim 3, and said reservoir mass including a liquid level and an air space adjacent said liquid level, and said venting means including an air vent for connecting said air space to the surrounding atmosphere, said rotary means and said aperture means being constructed and arranged to enable said pressure liquid at said aperture means to hydraulically interrupt the communication between said air vent and said aperture means during operation of said rotary means for precluding exposure of said air vent to said chamber and its said outlet liquid pressure, but to enable communication of said air vent with said chamber and said aperture means when said mechanism is at rest for freely venting said trapped air to said atmospheric pressure through said aperture means and said air vent.

6. The combination of means defined in claim 3, and said chamber being of generally cylindrical shape, and said rotary means including rotary impeller means for revolving said mass of liquid in said chamber to produce said centrifugal-liquid pressure varying as a function of the speed of said impeller means, said mass of liquid being caused by said centrifugal force to form a liquid annulus having a central air portion inside said annulus, and said reservoir means being adapted to supply liquid to said air portion inside said annulus for enabling said formation thereof and the development thereby of said centrifugal-liquid pressure.

7. In a fluid mechanism, the combination of, rotary means including centrifugal pumping means for revolving a mass of liquid to produce liquid pressure as a result of the centrifugal force thereof that varies as a function of the speed of rotation of said rotary means, pressure transmitter means communicating with said pumping means and including a trapped mass of air to convert said liquid pressure to air pressure also varying as a function of the speed of said rotary means, reservoir means to supply liquid to the inlet of said pumping means, aperture means communicating with the outlet of said pumping means and with said pressure transmitter means adjacent said reservoir means to vent said pressure transmitter means through said aperture means to the existing atmosphere adjacent said mechanism when said rotary means is at rest, said aperture means being located in relation to said pumping means and said pressure transmitter means to be hydraulically closed by the liquid flowing through said aperture means to effect said entrapment of air during normal operation of said mechanism, and pressure responsive means communicating with said pressure transmitter means and movable in response to changes in the pressure of said trapped air to positions varying as a function of the speed of said rotary means.

8. The combination of means defined in claim 7, and fluid manometer means operatively associated with said trapped air mass for indicating the rotary speed of said rotary means, said manometer means including transparent substantially vertical tubing means, said pressure responsive means comprising a second indicating liquid flowable in said transparent tubing means and communicating with said trapped air and movable to positions varying as a function of said pressure in said chamber to indicate visually the value of the speed of said rotary means.

9. The combination of means defined in claim 7, and said reservoir for said liquid having a liquid level therein exposed to atmospheric pressure, and said pressure transmitter means including a substantially vertical chamber positioned higher than said reservoir liquid level and disposed to receive said pressure liquid from said pumping means through said aperture means for producing a second liquid level in said vertical chamber, said aperture means being positioned higher than said reservoir level and communicating with substantially the lower portion of said vertical chamber and with at least a portion of the atmospheric pressure adjacent said reservoir level when said rotary pumping means is at rest to enable said pressure liquid to drain by gravity from said vertical chamber to said reservoir for exposing said aperture means through said vent mean to the existing atmosphere adjacent said liquid level for venting said trapped air thereto, said pressure liquid being adapted to cover said aperture means after initial rotation of said pumping means to effect said hydraulic entrapment of said mass of air during operation of said mechanism and produce said second liquid level.

10. In a pressure-generator mechanism, the combination of, rotary means for revolving a mass of liquid to produce liquid pressure as a result of the centrifugal force thereof that varies as a function of the speed of rotation of said rotary means, an air chamber associated with said rotary means, pressure responsive means communicating with said chamber, said air chamber including conduit means connecting said pressure responsive means with said liquid pressure, said conduit means including pressure transmitter means for converting said liquid pressure to equivalent air pressure and including a substantially fixed mass of air sealed and trapped in and completely filling said chamber and an adjacent portion of said conduit means during operation of said mechanism, the remaining portion of said conduit means being filled with a portion of said mass of liquid transmitted to said pressure transmitter means from said rotary means during operation of said mechanism but constrained from rotation after entering said pressure transmitter means, said trapped air acting to transmit remotely said pressures varying as a function of speed from said liquid portion to said pressure responsive means to effect movements thereof in response to changes in the speed of said rotary means, reservoir means to supply liquid to the inlet of said rotary means, aperture means between said pressure transmitter means and said rotary means, means adjacent said reservoir means to vent said trapped air through said apertures means to the surrounding atmospheric pressure when said rotary means is at rest.

11. In a fluid pressure-generator mechanism adapted to be mounted in a mobile vehicle and subject to acceleration, deceleration and centrifugal forces, the combination of, a centrifugal-liquid device including rotary means having its centerline in its rotary plane vertical and its rotary axis horizontal for revolving a mass of liquid to produce a liquid pressure as a result of the centrifugal force thereof that varies as a function of the speed of rotation of said rotary means, pressure transmitter means communicating with said rotary means and including a trapped mass of air to convert said liquid pressure to air pressure also varying as a function of the speed of rotation of said rotary means, reservoir means including two equal portions mounted symmetrically with respect to said vertical centerline through said rotary means, the fluid connection between said reservoir means and said rotary means being adapted to reside substantially at the center of said reservoir means, and said pressure transmitter means being mounted such that the center of mass of any liquid therein resides substantially on said center line.

12. In a fluid pressure-generator mechanism adapted to be mounted in a mobile vehicle and subject to acceleration, deceleration and centrifugal forces, the combination of, a centrifugal-liquid device including rotary means having its centerline in its rotary plane vertical and its rotary axis horizontal for revolving a mass of liquid to produce a liquid pressure as a result of the centrifugal force thereof that varies as a function of the speed of rotation of said rotary means, pressure-transmitter means communicating with said rotary means and including a trapped mass of air to convert said liquid pressure to air pressure also varying as a function of the speed of rotation of said rotary means, aperture means between said pressure transmitter means and said rotary means to vent said trapped air to the surrounding atmospheric pressure when said rotary means is at rest, and reservoir means including two equal portions mounted symmetrically with respect to said vertical centerline through said rotary means, the fluid connection between said reservoir means and said rotary means being adapted to reside substantially at the center of said reservoir means, and said pressure transmitter means being mounted such that the center of mass of any liquid therein resides substantially on said center line.

13. In a pressure-generator mecahnism, the combination comprising: rotary means for revolving a mass of liquid to produce a liquid pressure as a result of the centrifugal forces thereof that varies as a function of the speed of rotation of said rotary means, an air chamber associated with said rotary means, movable pressure responsive means communicating with said chamber, said air chamber including conduit means connecting said pressure responsive means with said liquid pressure, said conduit means including pressure transmitted means for converting said liquid pressure to equivalent air pressure, a substantially fixed mass of air sealed and trapped in and completely filling said chamber and an adjacent portion of said conduit means during operation of said mechanism, the remaining portion of said condiut means being filled with a portion of said mass of liquid transmitted to said pressure transmitter means from said rotary means during operation of said mechanism, a liquid reservoir having a liquid level and a passage communicating with said rotary means for feeding liquid thereto, said reservoir and said passage always having an air space adjacent said liquid therein and communicating with a portion of said rotary means at all times, means to vent said air space to the surrounding existing atmospheric pressure, said rotary means having an aperture communicating with said conduit means for directing pressure-liquid thereto, said aperture being located above said liquid level of said reservoir for permitting all the liquid to return to said rotary means and said reservoir and to vent said aperture and said pressure responsive means and said connecting conduit means to said then-existing atmospheric pressure through said air space and said air vent means whenever said mechanism is inactive.

14. The combination of means defined in claim 13, and said pressure transmitter means comprising a substantially vertical chamber in said conduit means exposed to said air chamber and mounted at a level higher than said level of liquid in said reservoir and disposed to receive said pressure liquid from said rotary means through said aperture for producing a second liquid level in said vertical chamber, the liquid forming said second liquid level being adapted to hydraulically seal and entrap said mass of air above same in said adjacent portion of said conduit means and in said air chamber, said aperture being adapted to be covered by said liquid soon after initial rotation of said rotary means to cause said sealing of said air in said pressure transmitter means, said aperture communicating with said vertical chamber at a lower portion thereof to enable said liquid to drain by gravity to said reservoir and for venting said aperture through said air space and said air-vent means to said then-existing atmospheric pressure when said mechanism is inactive.

15. The combination of means defined in claim 14, and a cylindrical chamber, and said rotary means including rotary impeller means for revolving said mass of liquid in said chamber to produce said centrifugal liquid pressures varying as a function of the speed of said impeller means, said mass of liquid being caused by said centrifugal force to form a liquid annulus having a central air portion inside said annulus and always in open communication with the surrounding atmosphere through said air vent means, and said reservoir pasasge communicating with said rotary means at said air portion inside said annulus for supplying liquid to form said annulus and for enabling same to develop said centrifugal-liquid pressure, and said impeller means being constructed and arranged to receive said supplied liquid at substantially atmospheric pressure.

16. In a pressure generator mechanism, the combination of, rotary means to produce liquid pressure that varies as a function of the speed of rotation of said rotary means, an air chamber associated with said rotary means, pressure responsive means communicating with said chamber, said air chamber including conduit means connecting said pressure responsive means with said liquid pressure, said conduit means including pressure transmitter means for converting said liquid pressure to equivalent air pressure and also including tube means filled with air and connecting said transmitter means to said pressure responsive means, a substantially fixed mass of air sealed and trapped in and completely filling said chamber and said tube means during operation of said mechanism, said pressure transmitter means including a well-chamber of enlarged cross-sectional area in relation to the cross-sectional area of said tube means to receive all of the liquid from said rotary means displaced incident to the operating movements of said pressure responsive means, a passage including aperture means connecting the lower portion of said well-chamber with said pressure liquid from said rotary means for enabling the movement of liquid to and from said lower portion, said well-chamber having its upper portion connected to said tube means for transmitting pressure from the liquid via the air in said upper portion and said tube means to said air chamber to effect movements of said pressure responsive means in responsive means in response to changes in the speed of said rotary means, said well-chamber having sufficient cross-sectional area that the liquid level formed by the entrapment of said air by said liquid varies in height only a small amount, whereby the actual pressure received by said pressure responsive means is only slightly reduced from the total pressure developed by said rotary means as a result of the added head of liquid in said well-chamber, said aperture means being adapted to be hydraulically covered by said pressure-liquid for initiating and maintaining said entrapment of said air in said chamber during normal operation of said rotary means, reservoir means to supply liquid to the inlet of said rotary means, and means adjacent said reservoir means to vent said trapped air to said existing atmospheric pressure through said aperture means when said rotary means is at rest.

17. The combination of means defined in claim 16, and said pressure generator mechanism comprising a centrifugal-liquid device including a mass of liquid adapted to be revolved by said rotary means to produce said liquid pressure as a result of the centrifugal force of said mass of revolving liquid, said liquid reservoir including a liquid level with an air space adjacent said liquid level and communicating with said rotary means for supplying liquid thereto, and said venting means comprising an air vent for connecting said air space to the surrounding atmosphere, said rotary means and said aperture means being constructed and arranged to enable said pressure liquid at said aperture means to hydraulically interrupt the communication between said air vent and said aperture means during operation of said rotary means for precluding exposure of said air vent to said outlet liquid pressure and said trapped air pressure, but to enable communication of said air vent with said aperture means when said device is at rest for freely venting said trapped air to said atmospheric pressure.

18. In a fluid mechanism, the combination of, rotary means to produce liquid pressure that varies as a function of the speed of rotation of said rotary means, said rotary means including a cylindrical housing, revolving means in said housing to move said liquid in a circular path to produce said liquid pressures, shaft means extending through said housing and connected to said revolving means for effecting said rotary movements thereof, the pressure of the liquid nearest said shaft means being substantially negligible, a liquid reservoir for feeding said liquid to said housing, the normal level of said liquid in said reservoir always being lower than any portion of the intersection of said shaft means and said revolving means, said baffle means at least partially surrounding said shaft means to prevent said liquid from flowing through the clearance between said shaft means and said housing by guiding said liquid around said shaft means when returning to said reservoir.

19. In a speed indicating instrument, the combination of, a centrifugal-liquid device including rotary means for revolving a mass of liquid to produce a liquid pressure as a result of the centrifugal force thereof that varies as a function of the speed of rotation of said rotary means, said rotary means including a chamber containing said revolving liquid for producing said centrifugal-liquid pressure therein, pressure transmitter means communicating with said rotary means chamber and including a trapped mass of air to convert said liquid pressure to air pressure also varying as a function of the speed of rotation of said rotary means, aperture means between said pressure transmitter means and said rotary means chamber at the pressure outlet thereof, reservoir means to supply liquid to the inlet of said rotary means, means adjacent said reservoir means to vent said trapped air through said aperture means to the surrounding atmospheric pressure when said rotary means is at rest, said aperture means being hydraulically closed by said liquid when same covers said aperture means and flows therethrough from said outlet of said chamber into said pressure transmitter means for initiating and maintaining therein said entrapment of said air pressure produced by said rotary means, pressure responsive means communicating with said pressure transmitter means and including means movable in response to changes in the pressure of said trapped air, said movable means including visual liquid indicating means movable to positions varying as a function of said trapped air pressure, and scale means cooperable with said liquid indicating means and graduated in units functional with the speed of rotation of said rotary means to indicate the speed thereof.

20. In a speed indicating instrument, the combination of; rotary means including centrifugal pumping means for revolving a mass of liquid to produce liquid pressure as a result of the centrifugal force thereof that varies as a function of the speed of rotation of said rotary means, pressure transmitter means communicating with said pumping means and including a trapped mass of air to convert said liquid pressure to air pressure also varying as a function of the speed of said rotary means, aperture means communicating with the outlet of said pumping means and also with said pressure transmitter means, reservoir means to supply liquid to the inlet of said rotary means, means adjacent said reservoir means to vent said pressure transmitter means to the existing atmosphere adjacent said mechanism when said rotary means is at rest, said aperture means being located in relation to said pumping means and said pressure transmitter means to be hydraulically closed by the liquid flowing through said aperture means from the outlet of said pumping means to effect said entrapment of air during normal operation of said mechanism, pressure responsive means communicating with said pressure transmitter means and including means movable in response to changes in the pressure of said trapped air, said movable means including visual indicating means movable to positions varying as a function of said trapped air pressure, and scale means cooperable with said indicating means and graduated in units functional with the speed of rotation of said rotary means to indicate the speed thereof.

21. The combination of means defined in claim 20, and said pressure responsive means including a diaphragm movable in response to said changes in the pressure of said trapped air, and said pressure responsive means also including rotary cam means operatively connected to said indicating means to cause said movement thereof, a flexible member operatively connected to said diaphragm and to said cam means for causing rotary movement thereof in response to said movements of said diaphragm, and spring means acting on said cam means to bias said flexible member and said cams in a direction opposite from the direction of movement thereof caused by said trapped air pressure acting on said diaphragm.

22. In a speed indicating instrument adapted to be mounted in a mobile vehicle and subject to acceleration, deceleration and centrifugal forces, the combination of, a centrifugal-liquid device including rotary means having its centerline in its rotary plane vertical and its rotary axis horizontal for revolving a mass of liquid to produce a liquid pressure as a result of the centrifugal force thereof that varies as a function of the speed of rotation of said rotary means, pressure transmitter means communicating with said rotary means and including a trapped mass of air to convert said liquid pressure to air pressure also varying as a function of the speed of rotation of said rotary means, reservoir means including two equal portions mounted symmetrically with respect to said vertical centerline through said rotary means the fluid connection between said reservoir means and said rotary means being adapted to reside substantially at the center of said reservoir means, said pressure transmitter means being mounted such that the center of mass of any liquid therein resides substantially on said centerline, pressure responsive means communicating with said pressure transmitter means and including means movable in response to changes in the pressure of the trapped air, said movable means including visual indicating means movable to positions varying as a function of said trapped air pressure, and scale means cooperable with said indicating means and graduated in units functional with the speed of rotation of said rotary means to indicate the speed thereof.

23. In a speed-indicating instrument, the combination of, a centrifugal-liquid device including rotary means for revolving a mass of liquid to produce a liquid pressure as a result of the centrifugal force thereof that varies as a function of the speed of rotation of said rotary means, pressure transmitter means communicating with said rotary means and including a trapped mass of air to convert said liquid pressure to air pressure also varying as a function of the speed of rotation of said rotary means, reservoir means to supply liquid to the inlet of said rotary means, aperture means between said pressure transmitter means and said rotary means, vent means adjacent said reservoir means to vent said trapped air to the surrounding atmospheric pressure through said aperture means when said rotary means is at rest, said aperture means being constructed and arranged to be hydraulically closed by said pressure-liquid during normal operation of said mechanism when said liquid passes through said aperture means from said rotary means to said pressure transmitter means to preclude said air venting action, pressure responsive means including a substantially frictionless diaphragm enclosing said trapped air on one side thereof and communicating with said pressure transmitter means and movable in response to changes in the pressure of said trapped air, spring means biasing the force produced by said last-named pressure acting on said diaphragm, a housing forming a chamber enclosed by said diaphragm on the other side thereof, a fixed mass of visible liquid in said chamber adjacent said diaphragm on said other side thereof, substantially transparent tube means communicating with said chamber for enabling said visible liquid to travel therethrough an amount varying as a function of the speed of said rotary means for indicating said speed, and scale means adjacent said tube means and graduated in units functional with the speed of said rotary means.

24. In a speed-indicating instrument, the combination of, a centrifugal-liquid device including rotary means for revolving a mass of liquid to produce a liquid pressure as a result of the centrifugal force thereof that varies as a function of the speed of rotation of said rotary means, pressure transmitter means communicating with said rotary means and including a trapped mass of air to convert said liquid pressure to air pressure also varying as a function of the speed of rotation of said rotary means, reservoir means to supply liquid to the inlet of said rotary means, aperture means communicating with the outlet of said rotary means and with said pressure transmitter means, means adjacent said reservoir means to vent said pressure transmitter means through said aperture means to the existing atmosphere when said rotary means is at rest, said aperture means being located in relation to said rotary means and said pressure transmitter means to be hydraulically closed by the liquid flowing through said aperture means to effect said entrapment of air during normal operation of said mechanism, a body of visible liquid in a generally U-shaped container having a pair of substantially vertical portions comprising legs of the U, at least one vertical portion communicating with said trapped air for subjecting said liquid therein to the pressure of said air that varies as a function of the speed of said rotary means, said other vertical portion comprising substantially transparent tube means for enabling said visible liquid to travel therethrough an amount varying as a function of the speed of said rotary means for indicating said speed, and scale means adjacent said tube means and graduated in units functional with the speed of said rotary means.

References Cited

UNITED STATES PATENTS

| | | | |
|---|---|---|---|
| 1,265,676 | 5/1918 | Klump | 73—406 |
| 2,575,935 | 11/1951 | Westerberg | 74—89.2 |
| 213,467 | 3/1879 | Storer | 73—502 |
| 740,698 | 10/1903 | Schlotfeldt | 73—500 |
| 1,025,342 | 5/1912 | Veeder | 73—500 |
| 1,090,938 | 3/1914 | Nelson | 73—502 |
| 1,222,985 | 4/1917 | Pharo | 73—523 |
| 1,441,300 | 1/1923 | Schmidt | 73—523 |
| 1,490,036 | 4/1924 | Sheppard | 73—406 |
| 2,099,385 | 11/1937 | Ciamberlini | 73—500 |

FOREIGN PATENTS

| | | |
|---|---|---|
| 154,529 | 11/1921 | Great Britain. |
| 524,556 | 5/1921 | France. |
| 459,226 | 4/1928 | Germany. |

JAMES J. GILL, *Primary Examiner.*